(12) United States Patent
Serizawa

(10) Patent No.: US 12,054,572 B2
(45) Date of Patent: Aug. 6, 2024

(54) COMPOSITION

(71) Applicant: DENKA COMPANY LIMITED, Tokyo (JP)

(72) Inventor: Shinya Serizawa, Shibukawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 597 days.

(21) Appl. No.: 17/293,695

(22) PCT Filed: Nov. 11, 2019

(86) PCT No.: PCT/JP2019/044194
§ 371 (c)(1),
(2) Date: May 13, 2021

(87) PCT Pub. No.: WO2020/100832
PCT Pub. Date: May 22, 2020

(65) Prior Publication Data
US 2021/0403629 A1    Dec. 30, 2021

(30) Foreign Application Priority Data

Nov. 15, 2018 (JP) .................................. 2018-214280

(51) Int. Cl.
| | | |
|---|---|---|
| C08F 290/06 | (2006.01) | |
| C08F 220/06 | (2006.01) | |
| C08F 220/18 | (2006.01) | |
| C08F 220/20 | (2006.01) | |
| C08K 5/14 | (2006.01) | |
| C08K 5/56 | (2006.01) | |
| C09J 175/16 | (2006.01) | |

(52) U.S. Cl.
CPC ........ C08F 290/067 (2013.01); C08F 220/06 (2013.01); C08F 220/1808 (2020.02); C08F 220/1811 (2020.02); C08F 220/20 (2013.01); C08K 5/14 (2013.01); C08K 5/56 (2013.01); C09J 175/16 (2013.01)

(58) Field of Classification Search
CPC .. C09J 175/16; C09J 4/06; C08K 5/56; C08K 5/14; C08G 18/758; C08G 18/155; C08G 18/672; C08G 18/4854; C08G 18/4233; C08F 290/067; C08F 220/20; C08F 220/1811; C08F 220/1808; C08F 220/06
USPC ..................................................... 522/90, 96
See application file for complete search history.

(56) References Cited

U.S. PATENT DOCUMENTS

| | | | | |
|---|---|---|---|---|
| 4,228,438 A | * | 10/1980 | Vazirani ................. | C09D 11/36 523/435 |
| 4,574,138 A | | 3/1986 | Moran, Jr. et al. ........... | 524/786 |
| 4,629,287 A | * | 12/1986 | Bishop ................... | C08G 18/10 385/141 |
| 9,315,695 B2 | * | 4/2016 | Rahim .................. | C08L 101/02 |
| 9,371,476 B1 | * | 6/2016 | Osae ....................... | C08L 67/06 |
| 2005/0256287 A1 | * | 11/2005 | Sugimoto ............ | C08G 18/672 528/44 |
| 2006/0052561 A1 | | 3/2006 | Ander et al. ............... | 526/303.1 |
| 2012/0156483 A1 | | 6/2012 | Shimazaki et al. .......... | 428/343 |
| 2012/0270038 A1 | | 10/2012 | Kim et al. .................... | 428/336 |

FOREIGN PATENT DOCUMENTS

| | | | | |
|---|---|---|---|---|
| CA | 2 389 502 A1 | 5/2001 | | |
| CN | 112646499 A | * | 4/2021 | .............. C09J 11/04 |
| EP | 0 108 630 A2 | 11/1983 | | |
| EP | 1448738 B1 | * | 9/2009 | ................ C09J 4/06 |
| EP | 4269462 A1 | * | 11/2023 | .......... C08F 283/006 |
| JP | 59-98179 A | 6/1984 | | |
| JP | 59-187014 A | 10/1984 | | |
| JP | 63-90525 A | 4/1988 | | |
| JP | 1-156387 A | 6/1989 | | |
| JP | 3-250014 A | 11/1991 | | |
| JP | 4-145185 A | 5/1992 | | |
| JP | 5-148337 A | 6/1993 | | |
| JP | 7-145225 A | 6/1995 | | |
| JP | H09505619 A | * | 6/1997 | |
| JP | H 10-259257 A | 9/1998 | | |
| JP | 2003-527259 A | 9/2003 | | |
| JP | 2006-506476 A | 2/2006 | | |
| JP | 2006-299257 A | 11/2006 | | |
| JP | 2008-174707 A | 7/2008 | | |
| JP | 2009-108278 A | 5/2009 | | |
| JP | 2012-224841 A | 11/2012 | | |
| JP | 2019-143049 A | 8/2019 | | |

(Continued)

OTHER PUBLICATIONS

International Search Report dated Jan. 21, 2020, issued by the Japanese Patent Office in corresponding application PCT/JP2019/044194.

(Continued)

*Primary Examiner* — Sanza L. McClendon
(74) *Attorney, Agent, or Firm* — Stein IP, LLC

(57) ABSTRACT

A composition comprising the following (A) to (D):
(A) 40 to 75 parts by mass of a urethane (meth)acrylate having a number-average molecular weight of 5,000 or more based on 100 parts by mass of the total of (A) and (B);
(B) a (meta)acrylic compound comprising:
  (B-1) a (meth)acrylate having no urethane bond, and
  (B-2) 15 to 25 parts by mass of a (meth)acrylic acid, based on 100 parts by mass of the total of (A) and (B);
(C) a polymerization initiator; and
(D) a reducing agent.

15 Claims, No Drawings

(56) References Cited

FOREIGN PATENT DOCUMENTS

| JP | 2019-172942 A | 10/2019 | |
|---|---|---|---|
| KR | 10-0484302 B1 | 4/2005 | |
| WO | WO-9514725 A1 * | 6/1995 | .......... C08F 283/008 |
| WO | WO 2011/024925 A1 | 3/2011 | |
| WO | WO-2018169609 A1 * | 9/2018 | ............ C08F 283/10 |
| WO | WO 2018/184847 A1 | 10/2018 | |

OTHER PUBLICATIONS

Notification of Transmittal of Translation of the International Preliminary Report on Patentability (Chapter I or Chapter II of the Patent Cooperation Treaty) dated May 27, 2021, issued by the International Bureau of WIPO in corresponding application PCT/JP2019/044194.

* cited by examiner

COMPOSITION

CROSS-REFERENCE TO RELATED APPLICATIONS

This application is a national stage of International Application No. PCT/JP2019/044194, filed Nov. 11, 2019, which claims the benefit of Japanese Application No. 2018-214280, filed Nov. 15, 2018, in the Japanese Patent Office, the disclosures of which are incorporated herein by reference.

TECHNICAL FIELD

The present invention relates to a composition.

BACKGROUND ART

Conventionally, steel plates have been used for automobile parts, and in view of the environmental load, there has been increasing demand for weight reduction of the parts. Therefore, parts, such as aluminum and CFRP that are lighter than steel plates, are combined for use. Automobiles manufactured by joining the different materials combined have been already manufactured and sold.

However, mechanical joining, such as rivet joining is mainly used for the joining, and the sites to which structural adhesives, such as epoxy-based adhesives used for joining different materials are applied, are limited, which is due to a problem in the durability and reliability of the structural adhesives. Specifically, the structural adhesive has poor elongation after curing and cannot relax stress caused by the difference in coefficient of linear expansion when different materials are joined, causing a problem of the deterioration of durability and peeling off of the adhesive surface (Patent Literature 1 to 4). Therefore, in order to relax stress when the different materials are joined, there has been proposed a one-component epoxy-based adhesive using an epoxy resin and a latent hardener, having an elongation of 15% after curing (Patent Literature 5). A curable resin composition characterized in that the composition comprises a urethane acrylate and a monofunctional unsaturated compound as a resin composition having a high elastic modulus and elongation from a low temperature to an elevated temperature and excellent in water resistance and heat resistance, has been reported (Patent Literature 6).

CITATION LIST

Patent Literature

Patent Literature 1: Japanese Patent Laid-Open No, 4-145185
Patent Literature 2: Japanese Patent Laid-Open No. 5-148337
Patent Literature 3: Japanese Patent Laid-Open No. 5-156227
Patent Literature 4: Japanese Patent Laid-Open No, 7-145225
Patent Literature 5: Japanese Patent Laid-Open No. 2009-108278
Patent Literature 6: Japanese Patent Laid-Open No. 63-090525

SUMMARY OF INVENTION

Technical Problem

However, in the automobile industry, it is necessary to assume that automobile parts are exposed to a wide range of temperatures. In the automobile industry, a low temperature environment generally refers to −20° C. or lower, and an elevated temperature environment refers to 80° C. or higher (i.e., temperature ranges that are not expected in a normal use passenger compartment). According to the method described in Patent Literature 5, the elongation of the cured product is small, and the stress due to the difference in coefficient of linear expansion when the different materials were joined, cannot be sufficiently relaxed. In particular, the epoxy-based adhesive has a problem of being poor in an elongation in a low temperature environment, and lowering an adhesive strength remarkably in a cold region of −20° C. or lower. On the other hand, for example, some urethane-based adhesives have a high elongation even in a low temperature environment, but tend to have a low elastic modulus in an elevated temperature environment, and cannot maintain a sufficient adhesive strength under elevated-temperature conditions. In the curable resin composition described in Patent Literature 6, the cured product thereof is said to have a high elastic modulus and elongation from a low temperature to a high temperature, and it demonstrates a high elastic modulus at from 20° C. to 60° C. However, Patent Literature 6 does not describe the temperature dependence of the elongation (in particular the elongation in a low temperature environment), nor does it describe the tensile elastic modulus in an elevated temperature environment as referred to in the automobile industry.

Thus, an object of the present invention is to provide a composition in which a cured product has properties required in the automobile industry, i.e., high elongation at a low temperature and a high elastic modulus even in an elevated temperature environment.

Solution to Problem

Namely the present invention enables to provide the following aspects:
<1> A composition comprising the following (A) to (D):
  (A) 40 to 75 parts by mass of a urethane (meth)acrylate having a number-average molecular weight of 5,000 or more based on 100 parts by mass of the total of (A) and (B);
  (B) a (meta)acrylic compound comprising:
    (B-1) a (meth)acrylate having no urethane bond, and
    (B-2) 15 to 25 parts by mass of a (meth)acrylic acid, based on 100 parts by mass of the total of (A) and (B);
  (C) a polymerization initiator; and
  (D) a reducing agent.
<2> A two-component composition, wherein when the composition according to <1> is divided into a first component and a second component, the first component comprises at least the (C) polymerization initiator, and the second component comprises at least the (D) reducing agent.
<3> A curable resin composition comprising the composition according to <1> or <2>.
<4> An adhesive composition comprising the composition according to <1> or <2>.
<5> A joined body joined by the adhesive composition according to <4>.
<6> A composition having an elongation at break of 20% or more at −20° C. at a tensile speed of 10 mm/min and a tensile elastic modulus of 100 MPa or more at 80° C.
<7> A composition, wherein a cured product of the composition in the form of a 1BA-type dumbbell-shaped test piece specified in JIS K7161-2: 2014, Annex A, has an elongation at break of 20% or more at −20° C. and 100% or more at 23°

C., at a tensile speed of 10 mm/min and a tensile elastic modulus of 100 MPa or more at 80° C.

<8> The composition according to <6> or <7>, comprising (A) a urethane (meth)acrylate and (B) a (meth)acrylic compound having no urethane bond.

<9> The composition according to <8>, wherein the (B) (meth)acrylic compound comprises (B-1) a (meth)acrylate having no urethane bond and (B-2) a (meth)acrylic acid.

<10> The composition according to <8> or <9>, wherein an amount of the (A) urethane (meth)acrylate used is 40 to 75 parts by mass based on 100 parts by mass of the total of (A) and (B).

<11> The composition according to any one of <8> to <10>, wherein the (A) urethane (meth)acrylate has a number-average molecular weight of 5,000 or more.

<12> The composition according to any one of <8> to <11>, wherein an amount of the (B-2) (meth)acrylic acid used is 15 to 25 parts by mass based on 100 parts by mass of the total of (A) and (B).

<13> The composition according to any one of <8> to <12>, further comprising (C) a polymerization initiator and (D) a reducing agent.

<14> A two-component composition, wherein when the composition according to <13> is divided into a first component and a second component, the first component comprises at least the (C) polymerization initiator, and the second component comprises at least the (D) reducing agent.

<15> A curable resin composition comprising the composition according to any one of <6> to <14>.

<16> An adhesive composition comprising the composition according to any one of <6> to <14>.

<17> A joined body joined by the adhesive composition according to <16>.

Advantageous Effects of Invention

The present invention provides a composition having a high elongation at a low temperature and a high elastic modulus even in an elevated temperature environment, as properties required in the automobile industry.

DESCRIPTION OF EMBODIMENTS

The numerical range in the present description includes an upper limit value and a lower limit value unless otherwise specified.

The present embodiment preferably comprises (A) a urethane (meth)acrylate and (B) a (meth)acrylic compound. Further, the present embodiment preferably comprises (C) a polymerization initiator and (D) a reducing agent.

In the present embodiment, a cured product of the composition in the form of a 1BA-type dumbbell-shaped test piece specified in JIS K7161-2: 2014, Annex A, preferably has an elongation at break of 20% or more at −20° C. at a tensile speed of 10 mm/min. In the present embodiment, it preferably has a tensile elastic modulus of 100 MPa or more at 80° C.

Further, in the present embodiment, the cured product of the composition in the form of a 1BA-type dumbbell-shaped test piece specified in JIS K7161-2: 2014, Annex A, preferably has an elongation at break of 100% or more at 23° C. at a tensile speed of 10 mm/min.

By the above specification, a composition in which the cured product has a high elongation from a low temperature to an elevated temperature and a high elastic modulus even in an elevated temperature environment, is obtained.

(A) Urethane (meth)acrylate

The (A) urethane (meth)acrylate refers to a urethane (meth)acrylate having a urethane bond in the molecule, obtained for example, by reacting (for example, polycondensation reaction) a polyol compound (hereinafter, represented by X), an organic polyisocyanate compound (hereinafter, represented by Y), and a hydroxy (meth)acrylate (hereinafter, represented by Z).

The polyol compound (X) (hereinafter may be simply referred to as a polyol) includes a polyether type, a polyester type, etc. The polyol may be a polyhydric alcohol. Among the polyols, one or more selected from neopentyl glycol, tetramethylene ether glycol, butanediol, hexanediol, and polyester polyol, are preferred.

The polyester polyol refers to a condensate of (1) a polyol and (2) a polybasic acid.

Among the polybasic acids, a dicarboxylic acid is preferred. The dicarboxylic acid is preferably one or more selected from maleic anhydride, maleic acid, fumaric acid, itaconic anhydride, itaconic acid, adipic acid, and isophthalic acid, and the adipic acid is more preferred.

The method for producing the urethane (meth)acylate is described in, for example, Japanese Patent Laid-Open No. 7-25957, Japanese Patent Laid-Open No. 2002-173515, Japanese Patent Laid-Open No. 7-292048, Japanese Patent Laid-Open No. 2000-351819, etc.

The organic polyisocyanate compound (Y) (hereinafter, may be simply referred to as an isocyanate), for example, such as aromatic-based, aliphatic-based, cyclic aliphatic-based, alicyclic-based polyisocyanates, etc., may be used. Among the isocyanates, one or more selected from isophorone diisocyanate (IPDI), diphenylmethane diisocyanate (MDI), hexamethylene diisocyanate (HMDI), and hydrogenated diphenylmethane diisocyanate (hydrogenated MDI) are preferred, and the isophorone diisocyanate is more preferred.

The hydroxy (meth)acrylate (Z) (hereinafter may be simply referred to as a hydroxy (meth)acrylate) is preferably a hydroxyalkyl (meth)acrylate.

Among the hydroxyalkyl (meth)acrylates, the hydroxyalkyl (meth)acrylate represented by formula (1):

$$Z-O-(R^1-O-)_p-H \qquad \text{Formula (1)}$$

wherein Z represents a (meth)acryloyl group, $R^1$ represents an alkylene group, and p represents an integer of 1 to 10, is preferred.

The alkylene group of $R^1$ in formula (1) preferably has 1 to 8 carbon atoms and more preferably 2 to 6 carbon atoms.

Among the hydroxyalkyl (meth)acrylates, one or more selected from 2-hydroxyethyl (meth)acrylate, 2-hydroxypropyl (meth)acrylate, and 4-hydroxybutyl (meth)acrylate are preferred, and the 2-hydroxyethyl (meth)acrylate is more preferred.

The number-average molecular weight of the urethane (meth)acrylate may preferably be 5,000 or more, more preferably 7,000 or more, and most preferably 18,000 or more. If it is 5,000 or more, the elongation at break at a low temperature is large. The number-average molecular weight of the urethane (meth)acrylate is preferably 50,000 or less and more preferably 30,000 or less.

The number-average molecular weight of the present embodiment is a value in terms of standard polystyrene measured by a gel permeation chromatography (GPC) method. Specifically, the number-average molecular weight is determined by preparing a calibration curve with commercially available standard polystyrenes and using tetrahydrofuran as a solvent with a GPC system (SC-8010 manufactured by Tosoh Corporation) under the following conditions:

Flow velocity: 1.0 ml/min
Set temperature: 40° C.
Column configuration: one "TSK guardcolumn MP (XL)" column (6.0 mm ID×4.0 cm), manufactured by Toso Corporation and two "TSK-GELMULTIPOREHXL-M" columns (each has 7.8 mm ID×30.0 cm and theoretical plate number of 16,000), 3 columns in total (theoretical plate number of 32,000 as a whole).
Sample injection volume: 100 μl (sample solution concentration of 1 mg/ml)
Liquid transfer pressure: 39 kg/cm$^2$
Detector: RI detector.

The amount of the urethane (meth)acrylate used is preferably 40 to 75 parts by mass and more preferably 44 to 75 parts by mass, based on 100 parts by mass of the total of (A) and (B). If it is 40 parts by mass or more, the elongation at break at a low temperature is large. If it is 75 parts by mass or less, the adhesion is large.

(B) (meth)acrylic Compound

The (B) (meth)acrylic compound is a radically polymerizable compound having a (meth)acryloyl group. The (B) (meth)acrylic compound excludes the (A) urethane (meth)acrylate.

The (B) (meth)acrylic compound preferably comprises (B-1) a (meth)acrylate having no urethane bond and (B-2) a (meth)acrylic acid.

The (B-1) (meth)acrylate refers to a (meth)acrylic compound excluding the (B-2) (meth)acrylic acid.

The (meth)acrylate includes a monofunctional (meth) acrylate and/or a polyfunctional (meth)acrylate. The polyfunctional (meth)acrylate refers to a (meth)acrylic compound having two or more (meth)acryloyl groups. The monofunctional (meth)acrylate refers to a (meth)acrylic compound having one (meth)acryloyl group. Among the (meth)acrylates, the monofunctional (meth)acrylate is preferred.

The (meth)acrylate is preferably one or more selected from a (meth)acrylate having a hydrocarbon group and a hydroxyalkyl (meth)acrylate. Among the (meth)acrylates, the (meth)acrylate having a hydrocarbon group is preferred. The hydrocarbon group is preferably an unsubstituted hydrocarbon group. The hydrocarbon group preferably has 2 to 16 carbon atoms. The hydrocarbon group is preferably a saturated aliphatic hydrocarbon group.

The hydrocarbon group is preferably one or more selected from an alkyl group and an alkylene group. The hydrocarbon group is preferably an aliphatic hydrocarbon group. The aliphatic hydrocarbon group is preferably one or more selected from an alicyclic hydrocarbon group and a non-alicyclic hydrocarbon group, and the alicyclic hydrocarbon group is more preferred.

The alicyclic hydrocarbon group is preferably an isobornyl group. The non-alicyclic hydrocarbon group is preferably an ethylhexyl group. The hydroxyalkyl (meth)acrylate includes the aforementioned hydroxyalkyl (meth)acrylate The amount of the (B) (meth)acrylic compound used is preferably 25 to 60 parts by mass and more preferably 25 to 56 parts by mass based on 100 parts by mass of the total of (A) and (B). If it is 25 parts by mass or more, the adhesion is large. If it is 60 parts by mass or less, the elongation at break at a low temperature is large.

The amount of the (B-1) (meth)acrylate used is preferably 1 to 38 parts by mass and more preferably 5 to 38 parts by mass based on 100 parts by mass of the total of (A) and (B). If it is 1 part by mass or more, the adhesion is large. If it is 38 parts by mass or less, the adhesion is large.

The (B-2) (meta)acrylic acid is a component giving a high tensile elastic modulus even in an elevated temperature environment, unlike the (meth)acrylate. The present inventors set up a hypothesis that the (meth)acrylic acid generates hydrogen bonds with other molecules due to the carboxyl group thereof, contributing to the tensile elastic modulus. This effect cannot be obtained by the (meth)acrylate alone even if it has a bulky high molecular weight, such as the isobornyl (meth)acrylate, and it is conjectured just to be a synergistic effect by coexistence of the (meth)acrylate and the (meth)acrylic acid. The (B-2) (meth)acrylic acid is preferably methacrylic acid.

The amount of the (B-2) (meth)acrylic acid used is preferably 15 to 25 parts by mass and more preferably 15 to 24 parts by mass based on 100 parts by mass of the total of (A) and (B). If it is 15 parts by mass or more, the tensile elastic modulus at an elevated temperature is large. If it is 25 parts by mass or less, the elongation at break at a low temperature is large.

(C) Polymerization Initiator

The polymerization initiator used in the present embodiment is preferably an organic peroxide from the viewpoint of reactivity thereof.

The organic peroxide includes cumene hydroperoxide, para menthane hydroperoxide, tertiary butyl hydroperoxide, etc. Of these, the cumene hydroperoxide is preferred in terms of reactivity thereof.

The amount of the (C) polymerization initiator used is preferably 0.1 to 20 parts by mass and more preferably 0.5 to 15 parts by mass based on 100 parts by mass of the total of (A) and (B) (i.e., in terms of outer percentage). If it is 0.1 part by mass or more, the curing rate becomes high, and if it is 20 parts by mass or less, the storage stability is favorable, (D) Reducing Agent As the reducing agent used in the present embodiment, any publicly known reducing agent that reacts with the polymerization initiator to generate radicals, may be used. The reducing agent is preferably one or more selected from a tertiary amine, a thiourea derivative, and a transition metal salt, and the transition metal salt is more preferred. The transition metal salt includes cobalt naphthenate, copper naphthenate, vanadyl acetylacetonate, etc. Among the transition metal salts, the vanadyl acetylacetonate is preferred.

The amount of the (D) reducing agent used is preferably 0.01 to 10 parts by mass and more preferably 0.1 to 5 parts by mass based on 100 parts by mass of the total of (A) and (B) (i.e., in terms of outer percentage). If it is 0.01 parts by mass or more, the curing rate becomes high, and if it is 10 parts by mass or less, the storage stability is favorable.

The present embodiment may be used as, for example, a two-component curable resin composition. For the two-component composition, all the essential components of the curable resin components of the present embodiment are divided into a first component and a second component without mixing during storage, and one of these comprises at least the (C) polymerization initiator, and the other comprises at least the (D) reducing agent. In this case, the first component and the second component may be applied simultaneously or separately, contacted with each other, and then cured to be used for a two-component curable resin composition.

The present embodiment may be used as, for example, an adhesive composition. An adherend may be joined by the adhesive composition of the present embodiment to fabricate a joined body. The various materials of the adherend include paper, wood, ceramics, glass, pottery, rubber, plastics, mortar, concrete and metals, and are not particularly limited thereto.

EXAMPLES

The present embodiment will be described in detail below with reference to Experimental Examples. Hereinafter, the units of amounts of various substances used are indicated in parts by mass.

The urethane (meth)acrylate was obtained by reacting a polyol, an isocyanate, and a hydroxy (meth)acrylate.

Materials Used

Urethane acrylate A: The number-average molecular weight thereof is 20,000. The polyol is a polyester polyol obtained by polycondensation of a polyol A and a dicarboxylic acid. The polyol A is butanediol and hexanediol. The dicarboxylic acid is adipic acid. The isocyanate is isophorone diisocyanate. The hydroxy (meth)acrylate is 2-hydroxyethyl acrylate.

Urethane acrylate B: The number-average molecular weight thereof is 7,000. The polyol is a polyester polyol obtained by polycondensation of a polyol B and a dicarboxylic acid. The polyol B is neopentyl glycol. The dicarboxylic acid is adipic acid. The isocyanate is isophorone diisocyanate. The hydroxy (meth)acrylate is 2-hydroxyethyl acrylate.

Urethane acrylate C: The number-average molecular weight thereof is 5,000. The polyol is tetramethylene glycol. The isocyanate is hydrogenated diphenylmethane diisocyanate. The hydroxy (meth)acrylate is 2-hydroxyethyl acrylate.

Urethane acrylate D: The number-average molecular weight thereof is 3,500. The polyol is a polyester polyol obtained by polycondensation of a polyol A and a dicarboxylic acid. The polyol A is butanediol and hexanediol. The dicarboxylic acid is adipic acid. The isocyanate is isophorone diisocyanate. The hydroxy (meth)acrylate is 2-hydroxyethyl acrylate.

Urethane acrylate E: The number-average molecular weight thereof is 12.000. The polyol is tetramethylene glycol. The isocyanate is isophorone diisocyanate. The hydroxy (meth)acrylate is 2-hydroxyethyl acrylate.

Methacrylic acid: A commercial product
Hydroxypropyl methacrylate: A commercial product
Ethylhexyl methacrylate: A commercial product
Isobornyl acrylate: A commercial product
Cumene hydroperoxide: A commercial product
Vanadyl acetylacetonate: A commercial product Various physical properties were measured as follows.

Elongation at Break and Tensile Elastic Modulus

The physical properties at the temperatures shown in Table 1 were measured. The measurement method is in compliance with the test method according to the section of "Plastics-Determination of tensile properties" of JIS K7161-1: 2014 and K7161-2: 2014. By using a cured product in the form of a 1BA-type dumbbell-shaped test piece obtained by curing in an environment of 23° C. and a relative humidity of 50% for 24 hours, the measurement was carried out under the conditions of a tensile speed of 10 mm/min in an atmosphere of 23° C. A tensile tester, "INSTRON5967" (manufactured by Instron) was used, and the elongation at break and the tensile elastic modulus were measured. As the evaluation at an elevated temperature, a specimen obtained by curing in an environment of 23° C. and a relative humidity of 50% for 24 hours was heated for 30 minutes in a high-temperature chamber SPHH-201 (manufactured by ESPEC Corporation, (R)) at 80° C. and was evaluated in the same manner in an atmosphere of 80° C. As an evaluation at a low temperature, a specimen obtained by curing in an environment of 23° C. and a relative humidity of 50% for 24 hours was cooled for 30 minutes in a low temperature and humidity testing chamber WU-200 (manufactured by ESPEC Corporation, (R)) at −20° C., and was evaluated in the same manner in an atmosphere of −20° C. The tensile elastic modulus was determined from the slope of the stress/strain curve by linear regression between 0.05% and 0.2% of strain in compliance with JIS K7161-2: 2014.

It is preferred that the elongation at break is 20% or more in an atmosphere of −20° C., the elongation at break is 100% or more in an atmosphere of 23° C., the elongation at break is 100% or more in an atmosphere of 80° C., and the tensile elastic modulus is 100 MPa or more in an atmosphere of 80° C., from the viewpoint of sufficient elongation in a low temperature environment and of capable of being used as a structural adhesive even in an elevated temperature environment in the automobile industry.

Shear Adhesion Strength

The physical properties at the temperatures shown in Table 1 were measured, which were in compliance with JIS K6850: 1999. One side of a test piece (100×25×5 mm SPCC), was coated with an adhesive composition comprising a mixture of the two components and the piece was immediately pasted with the other test piece (100×25×5 mm SPCC) together, and then they were cured at room temperature for 24 hours to prepare a specimen for measuring a tensile shear adhesive strength (hereinafter may also be referred to simply as shear adhesive strength). In order to render uniform, the thickness of the adhesive composition layer, a small amount of glass beads having particle sizes of 125 μm was added to the adhesive composition. The tensile shear adhesive strength (unit: MPa) was measured at a tensile speed of 10 mm/min in an environment of a temperature of 23° C. and a humidity of 50%.

The tensile shear adhesive strength is preferably 20 MPa or more in an atmosphere of 23° C. from the viewpoint of capable of being used as a structural adhesive.

Experimental Examples 1 to 10

The materials were mixed at the composition ratios shown in Tables 1 and 2 to prepare adhesive compositions each composed of the first component and the second component shown in Table 1. The first component and the second component were mixed in equivalent amounts by mass ratio. The physical properties of the obtained two-component adhesive composition were measured. The results are also shown in Tables 1 and 2. The amounts of (C) and (D) are those denoted in terms of outer percentage based on the total of 100 parts by mass of (A) and (B).

TABLE 1

| Experiment No. | | Experimental Example 1 | | Experimental Example 2 | |
|---|---|---|---|---|---|
| | | First component | Second component | First component | Second component |
| (A) Urethane (meth)acrylate | Urethane acrylate A (number-average molecular weight: 20,000) | 44% | 44% | | |
| | Urethane acrylate B (number-average molecular weight: 7,000) | | | 66% | 66% |
| | Urethane acrylate C (number-average molecular weight: 5,000) | | | | |
| | Urethane acrylate D (number-average molecular weight: 3,500) | | | | |
| | Urethane acrylate E (number-average molecular weight: 12,000) | | | | |
| (B) (Meta)acrylic compound | Methacrylic acid | 18% | 18% | 18% | 18% |
| | Hydroxypropyl methacrylate | 7% | 7% | | |
| | Ethylhexyl methacrylate | 7% | 7% | | |
| | Isobornyl acrylate | 24% | 24% | 16% | 16% |
| | (A) + (B) | 100% | 100% | 100% | 100% |
| (C) Polymerization initiator | Cumene hydroperoxide | 3% | | 3% | |
| (D) Reducing agent | Vanadyl acetylacetonate | | 0.5% | | 0.5% |
| Elongation at break (%) | −20° C. | 25 | | 30 | |
| | 23° C. | 250 | | 175 | |
| | 80° C. | >300 | | 250 | |
| Tensile elastic modulus (MPa) | 80° C. | 130 | | 120 | |
| Shear adhesive strength (MPa) | 23° C. | 25 | | 26 | |
| Remarks | | Example | | Example | |

| Experiment No. | | Experimental Example 3 | | Experimental Example 4 | |
|---|---|---|---|---|---|
| | | First component | Second component | First component | Second component |
| (A) Urethane (meth)acrylate | Urethane acrylate A (number-average molecular weight: 20,000) | | | | |
| | Urethane acrylate B (number-average molecular weight: 7,000) | | | | |
| | Urethane acrylate C (number-average molecular weight: 5,000) | 75% | 75% | | |
| | Urethane acrylate D (number-average molecular weight: 3,500) | | | | |
| | Urethane acrylate E (number-average molecular weight: 12,000) | | | 71% | 71% |
| (B) (Meta)acrylic compound | Methacrylic acid | 15% | 15% | 24% | 24% |
| | Hydroxypropyl methacrylate | 2% | 2% | | |
| | Ethylhexyl methacrylate | 8% | 8% | | |
| | Isobornyl acrylate | | | 5% | 5% |
| | (A) + (B) | 100% | 100% | 100% | 100% |
| (C) Polymerization initiator | Cumene hydroperoxide | 3% | | 3% | |
| (D) Reducing agent | Vanadyl acetylacetonate | | 0.5% | | 0.5% |
| Elongation at break (%) | −20° C. | 20 | | 60 | |
| | 23° C. | 125 | | 230 | |
| | 80° C. | 200 | | 170 | |

TABLE 1-continued

| | | | |
|---|---|---|---|
| Tensile elastic modulus (MPa) | 80° C. | 150 | 120 |
| Shear adhesive strength (MPa) | 23° C. | 23 | 26 |
| Remarks | | Example | Example |

% denotes % by mass.

TABLE 2

| | | Experimental Example 5 | | Experimental Example 6 | | Experimental Example 7 | |
|---|---|---|---|---|---|---|---|
| Experiment No. | | First component | Second component | First component | Second component | First component | Second component |
| (A) Urethane (meth)acrylate | Urethane acrylate A (number-average molecular weight: 20,000) | 35% | 35% | | | 57% | 57% |
| | Urethane acrylate B (number-average molecular weight: 7,000) | | | | | | |
| | Urethane acrylate C (number-average molecular weight: 5,000) | | | | | | |
| | Urethane acrylate D (number-average molecular weight: 3,500) | | | 75% | 75% | | |
| | Urethane acrylate E (number-average molecular weight: 12,000) | | | | | | |
| (B) (Meta)acrylic compound | Methacrylic acid | 18% | 18% | 15% | 15% | 12% | 12% |
| | Hydroxypropyl methacrylate | 14% | 14% | 2% | 2% | | |
| | Ethylhexyl methacrylate | 14% | 14% | 8% | 8% | | |
| | Isobornyl acrylate | 19% | 19% | | | 31% | 31% |
| | (A) + (B) | 100% | 100% | 100% | 100% | 100% | 100% |
| (C) Polymerization initiator | Cumene hydroperoxide | 3% | | 3% | | 3% | |
| (D) Reducing agent | Vanadyl acetylacetonate | | 0.5% | | 0.5% | | 0.5% |
| Elongation at break (%) | −20° C. | 10 | | 8 | | 200 | |
| | 23° C. | 250 | | 100 | | 230 | |
| | 80° C. | >300 | | 150 | | >300 | |
| Tensile elastic modulus (MPa) | 80° C. | 210 | | 190 | | 30 | |
| Shear adhesive strength (MPa) | 23° C. | 25 | | 22 | | 20 | |
| Remarks | | Comparative Example | | Comparative Example | | Comparative Example | |

| | | Experimental Example 8 | | Experimental Example 9 | | Experimental Example 10 | |
|---|---|---|---|---|---|---|---|
| Experiment No. | | First component | Second component | First component | Second component | First component | Second component |
| (A) Urethane (meth)acrylate | Urethane acrylate A (number-average molecular weight: 20,000) | 47% | 47% | 65% | 65% | 80% | 80% |
| | Urethane acrylate B (number-average molecular weight: 7,000) | | | | | | |
| | Urethane acrylate C (number-average molecular weight: 5,000) | | | | | | |
| | Urethane acrylate D (number-average molecular weight: 3,500) | | | | | | |
| | Urethane acrylate E (number-average molecular weight: 12,000) | | | | | | |

TABLE 2-continued

| (B) (Meta)acrylic compound | Methacrylic acid | 28% | 28% | 0% | 0% | 15% | 15% |
|---|---|---|---|---|---|---|---|
| | Hydroxypropyl methacrylate | | | | | 5% | 5% |
| | Ethylhexyl methacrylate | | | | | | |
| | Isobornyl acrylate | 25% | 25% | 35% | 35% | | |
| (A) + (B) | | 100% | 100% | 100% | 100% | 100% | 100% |
| (C) Polymerization initiator | Cumene hydroperoxide | 3% | | 3% | | 3% | |
| (D) Reducing agent | Vanadyl acetylacetonate | | 0.5% | | 0.5% | | 0.5% |
| Elongation at break (%) | −20° C. | 10 | | 300 | | 36 | |
| | 23° C. | 220 | | 240 | | 240 | |
| | 80° C. | >300 | | >300 | | >300 | |
| Tensile elastic modulus (MPa) | 80° C. | 280 | | 20 | | 85 | |
| Shear adhesive strength (MPa) | 23° C. | 28 | | 15 | | 20 | |
| Remarks | | Comparative Example | | Comparative Example | | Comparative Example | |

% denotes % by mass.

As shown in Tables 1 and 2, the followings are found: The composition of the present embodiment demonstrates the elongation at break of 20% or more in the low temperature environment of −20° C., the elongation at break of 100% or more in the normal temperature environment of 23° C. and the tensile elastic modulus of 100 MPa or more in the elevated temperature environment of 80° C.

The Experimental Example 5 demonstrates the low elongation at break at the low temperature because the amount of urethane (meth)acrylate used is small. The Experimental Example 6 demonstrates the low elongation at break at the low temperature because the number-average molecular weight of urethane (meth)acrylate is small. The Experimental Example 7 demonstrates the low tensile elastic modulus at the elevated temperature because the amount of (meth) acrylic acid used is small. The Experimental Example 8 demonstrates the low elongation at break at the low temperature because the amount of (meth)acrylic acid used is large. The Experimental Example 9 demonstrates the low tensile elastic modulus at the elevated temperature because the (meth)acrylic acid is not used. The Experimental Example 10 demonstrates the low tensile elastic modulus at the elevated temperature because the amount of urethane (meth)acrylate used is too large.

Therefore, according to the present embodiment, the curable resin composition in which the cured product has a high elongation from a low temperature to an elevated temperature and has a high elastic modulus even in an elevated temperature environment, is obtained.

In the present embodiment, for example, with respect to automobile parts composed of different materials, an adhesive composition capable of sufficiently relaxing the stress due to the difference in coefficient of linear expansion between the different materials from a low temperature environment to an elevated temperature environment and having the sufficient adhesive strength, can be provided.

In applications, such as automobile parts and housings for electric appliances, they are required not to be broken in practical use. Therefore, it is required for them to maintain a high elongation at break (for example, impact resistance) while maintaining a high tensile elastic modulus (for example, rigidity), i.e., a composition having a large elastic modulus and tensile elongation at break is required.

Since the adhesive composition of the present embodiment has high rigidity and high impact resistance, it can be used for heterogeneous joining of automobile parts and housings for electric appliances.

The invention claimed is:

1. A composition comprising the following (A) to (D):
   (A) 40 to 75 parts by mass of a urethane (meth)acrylate having a number-average molecular weight of 5,000 or more based on 100 parts by mass of the total of (A) and (B);
   (B) a (meta)acrylic compound comprising:
      (B-1) a (meth)acrylate having no urethane bond, and
      (B-2) 15 to 25 parts by mass of a (meth)acrylic acid, based on 100 parts by mass of the total of (A) and (B);
   (C) a polymerization initiator; and
   (D) a reducing agent.

2. A two-component composition, wherein when the composition according to claim 1 is divided into a first component and a second component, the first component comprises at least the (C) polymerization initiator, and the second component comprises at least the (D) reducing agent.

3. A curable resin composition comprising the composition according to claim 1.

4. An adhesive composition comprising the composition according to claim 1.

5. A joined body joined by the adhesive composition according to claim 4.

6. A composition, comprising (A) a urethane (meth) acrylate and (B) a (meth)acrylic compound having no urethane bond,
   wherein the composition has an elongation at break of 20% or more at −20° ° C. at a tensile speed of 10 mm/min and a tensile elastic modulus of 100 MPa or more at 80° ° C., or
   wherein a cured product of the composition in the form of a 1BA-type dumbbell-shaped test piece specified in JIS K7161-2: 2014, Annex A, has an elongation at break of 20% or more at −20° C. and 100% or more at 23° C., at a tensile speed of 10 mm/min and a tensile elastic modulus of 100 MPa or more at 80° ° C.

7. The composition according to claim 6, wherein (B) the (meth)acrylic compound having no urethane bond comprises (B-1) a (meth)acrylate having no urethane bond and (B-2) a (meth)acrylic acid.

8. The composition according to claim 6, wherein an amount of the (A) urethane (meth)acrylate used is 40 to 75 parts by mass based on 100 parts by mass of the total of (A) and (B).

9. The composition according to claim 6, wherein the (A) urethane (meth)acrylate has a number-average molecular weight of 5,000 or more.

10. The composition according to claim 6, wherein an amount of the (B-2) (meth)acrylic acid having no urethane bond used is 15 to 25 parts by mass based on 100 parts by mass of the total of (A) and (B).

11. The composition according to claim 6, further comprising (C) a polymerization initiator and (D) a reducing agent.

12. A two-component composition, wherein when the composition according to claim 11 is divided into a first component and a second component, the first component comprises at least the (C) polymerization initiator, and the second component comprises at least the (D) reducing agent.

13. A curable resin composition comprising the composition according to claim 6.

14. An adhesive composition comprising the composition according to claim 6.

15. A joined body joined by the adhesive composition according to claim 14.

* * * * *

UNITED STATES PATENT AND TRADEMARK OFFICE
CERTIFICATE OF CORRECTION

PATENT NO. : 12,054,572 B2
APPLICATION NO. : 17/293695
DATED : August 6, 2024
INVENTOR(S) : Shinya Serizawa Page 1 of 1

It is certified that error appears in the above-identified patent and that said Letters Patent is hereby corrected as shown below:

In the Claims

On Column 14, in Claim 6, Line 5 reads:
20% or more at –20° °C.

Should read:
20% or more at –20° C.

On Column 14, in Claim 6, Line 7 reads:
more at 80° °C.

Should read:
more at 80° C.

On Column 14, in Claim 6, Line 13 reads:
modulus of 100 MPa or more at 80° °C.

Should read:
modulus of 100 MPa or more at 80° C.

Signed and Sealed this
Eleventh Day of March, 2025

Coke Morgan Stewart
*Acting Director of the United States Patent and Trademark Office*